May 6, 1958     E. C. BOPF     2,833,196
STEERING CONTROL MEANS
Filed Sept. 6, 1955     2 Sheets-Sheet 1

INVENTOR.
E. C. BOPF

May 6, 1958　　　　　E. C. BOPF　　　　2,833,196
STEERING CONTROL MEANS

Filed Sept. 6, 1955　　　　　　　　　　2 Sheets-Sheet 2

INVENTOR.
E. C. BOPF

United States Patent Office 2,833,196
Patented May 6, 1958

2,833,196

STEERING CONTROL MEANS

Edward C. Bopf, Des Moines, Iowa, assignor to Deere Manufacturing Co., Dubuque, Iowa, a corporation of Iowa Application September 6, 1955, Serial No. 532,653

10 Claims. (Cl. 97—47.41)

This invention relates to vehicle control means and more particularly to mechanism for restricting the steerable wheel means of a tractor or the like under certain operating conditions.

A preferred embodiment of the invention finds practical utility in the tractor and implement field, particularly in a tractor and implement combination in which an implement part extends in such close proximity to the steerable front wheel of the tractor so as to cause contact between the wheel and the implement part upon steering of the wheel beyond a certain range. This is particularly true in the case of a tractor-mounted corn picker or similar harvester in which gathering chains or the like operate normally in close proximity to the front wheel. At the end of the field or under other conditions in which a relatively sharp turn is made, it happens that the tire on the wheel engages the gathering chain, causing damage to both parts. In a typical tractor-mounted corn picker, the corn picker is carried by the tractor for raising and lowering between transport and operating position and the construction is such that when the corn picker is in its raised position it clears the front wheel, which therefore takes care of the situation at the end of the field, because when the end of the field is reached the picker is raised and there would normally be no interference between the wheel and gathering chains, for example. However, in contour picking, more than the usual amount of steering is required and at the same time the picker must be in its operating position. Consequently, the problem of interference between the steerable wheel and the picking mechanism is still present. According to the present invention, this problem is eliminated by limit means which has two positions. In one position, it limits steering of the steerable wheel means to a range less than normal and thereby prevents interference between the wheel and the picker part. In its second position, it is movable out of controlling engagement with the wheel so that the wheel can have its normal range of steering. The limit means is interconnected with the lift device on the tractor that raises and lowers the picker between transport and operating positions, so that when the picker is raised, the limit means is moved to its position in which it releases the steerable wheel for normal steering. A further feature of the invention is to utilize the principles just described in connection with a tractor having steering mechanism of the fluid-pressure-operated type. In this form of the invention the limit means is so arranged as to cut out the power steering system when the steerable wheel means is moved in excess of a range short of contacting the harvesting mechanism. The invention features further the provision of a simple expedient that may be readily attached to tractors of existing construction.

The foregoing and other important objects and desirable features inherent in and encompassed by the invention will become apparent as preferred embodiments are disclosed in detail in the ensuing specification and accompanying sheets of drawings, the several figures of which will be described immediately below.

Figure 1:
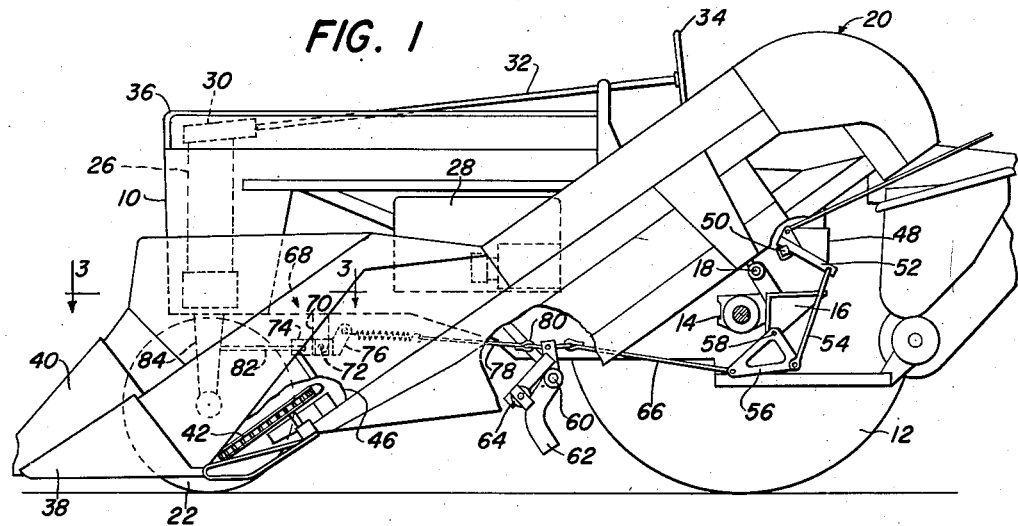
Fig. 1 shows a typical tractor-mounted corn picker, with portions thereof broken away to expose interior parts.

The tractor chosen for the purposes of illustration is typical of many agricultural tractors and has a relatively narrow fore-and-aft extending body 10 carried on rear traction wheels, only one of which is shown at 12, since the other is removed in the interests of clarification of the drawing. The traction wheels support the tractor body by means of a transverse rear axle structure including a lateral axle housing 14 on which a suitable bracket 16 is mounted to afford a transverse pivot at 18 for the mounting of an implement, here a corn picker designated in its entirety by the numeral 20. The forward end of the tractor body 10 is carried on steerable wheel means, here in the form of a truck 22 comprising a pair of relatively closely spaced apart wheels steerable about an upright axis afforded by a spindle 24 that is journaled in a pedestal housing 26 ahead of the tractor power plant, the designation of which is accomplished by the numeral 28. The upper portion of the pedestal 26 may include, as is conventional, a worm and gear housing 30 into which a fore-and-aft steering wheel shaft 32 projects, the rear end of the shaft having thereon a steering wheel 34 adjacent to the rear end of the tractor. Typical radiator and engine hood structure 36 encloses the pedestal 26 and worm gear housing 30 and overlies the engine 28.

Figure 2:
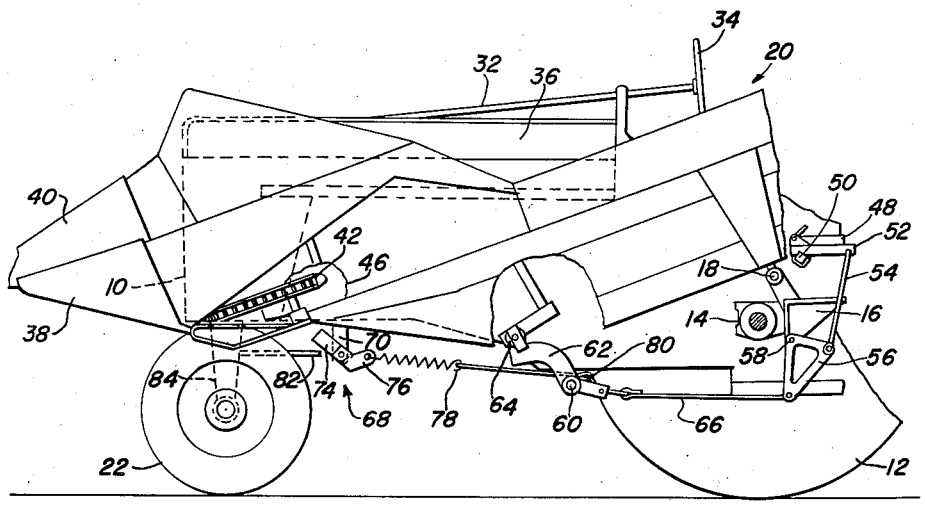
Fig. 2 is a similar view, but showing the picker in its raised position.

The corn picker 20, chosen here for purposes of illustration, is of the two-row type and includes a gathering unit 38 at each side of the tractor. As will be seen, each gathering unit projects in relatively close proximity to the opposite sides of the body and the two units are interconnected by a central divider 40. Each gathering unit has inner and outer gathering chains 42 and 44 respectively. Since the structure is symmetrical at both sides, reference will be had only to the left hand side. With reference to Figs. 1 and 2, attention is called to the fact that a portion of the left hand gathering unit 38 is broken away at 46 so that the gathering chain visible is the chain 42. On the whole, it will be seen that the chain 42 is relatively close to the steerable truck 22 and it will be clear that if the steerable truck is turned through a maximum steering range, the tires of the wheels of the truck will engage the chain. This is the problem that is avoided by the present invention, the details of which will be discussed below.

As is conventional, the corn picker 20 is carried on the pivot 18 on the tractor body for movement between transport and operating positions. The operating position is shown in Fig. 1, and the transport position is shown in Fig. 2. It will be seen, from Fig. 2, that in the transport position the gathering units 38 are raised to such height as to clear the gathering chains from contact with the steerable truck 22. Adjustment of the picker 20 between its raised and lowered or transport and operating positions is effected by a lift device, here of the power-operated type containing mechanism (not shown) contained in a power lift housing 48 conventionally mounted at the rear of the tractor and including a transverse rockshaft 50 to which a lift arm 52 is connected. In the present case, the lift arm 52 is connected by a lift link 54 to a bell crank 56 which is in turn pivoted at 58 on the bracket 16 on the rear axle housing 14. The tractor body 10 carries intermediate its front and rear ends a transverse lift shaft 60 on which is a curved arm 62 engageable with a roller 64 carried by the picker 20. When the lift shaft 60 is rocked in a clockwise direction, the arm 62 engages the roller 64 and lifts the picker from the position of Fig. 1 to that of Fig. 2. A forwardly extending link 66 interconnects the bell crank 56 and the lift shaft 60 so that power from the lift device is transmitted to the lift shaft.

Figure 3:
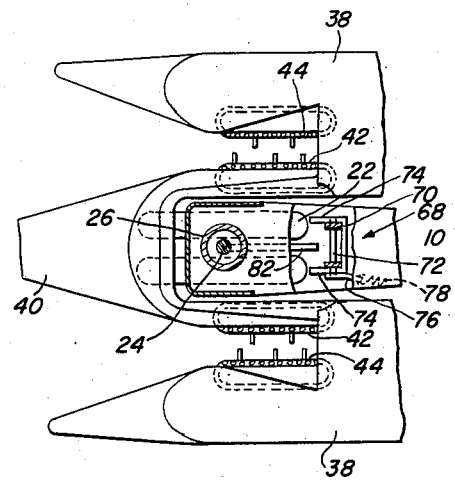
Fig. 3 is a fragmentary plan view, partly in section, as seen along the line 3—3 of Fig. 1.

The limit means for the steering mechanism is identified in its entirety by the numeral 68 and comprises support means 70 suitably fixed to an under portion of the tractor just to the rear of the front wheels 22 and rockable means comprising a transverse rockshaft 72 journaled in the support 70 and having a pair of laterally spaced forwardly extending arms 74. One end of the rockshaft has an upwardly and rearwardly extending arm 76 to which a connection 78 is made to the power lift device by means of a connection to the transverse lift shaft 60, as at 80. The purpose of the tension spring in the connection 78 is to accommodate overtravel of the power lift device in raising the picker to its transport position. The limit means 68 is in its down or operating position in Fig. 1, from which, together with Fig. 3, it will be seen that the arms 74 straddle a rearwardly projecting arm 82 affixed to a lower pedestal portion 84 of the steerable truck 22. The arms 74 are thus in position to be engaged by the truck arm 82, which thereby confines the angular range of the arm 82 to the limits set up by the arms 74. These limits are sufficient to prevent engagement of the tires of the truck 22 with the inner gathering chains 42 when the picker is in the operating position of Fig. 1.

Fig. 2 shows the second or released position of the limit means 68, from which it will be clear that when the picker is raised to its transport position, the connection with the lift device, via 78, causes the limit means to rock in a clockwise direction, so that the arms 74 clear the arm 82, whereby full or normal range steering of the wheel 22 is available. The overall theory of the invention is that during operation of the picker, with the gathering units 38 in their operating positions as shown in Fig. 1, inadvertent excess steering of the vehicle will not result in interference between the wheel 22 and gathering chains 42. Yet, when the end of the row is reached and it is necessary to make a sharp turn, the picker is raised in any event and the connection at 78 automatically clears the limit means 68 from engageability with the arm 82.

Figure 4:
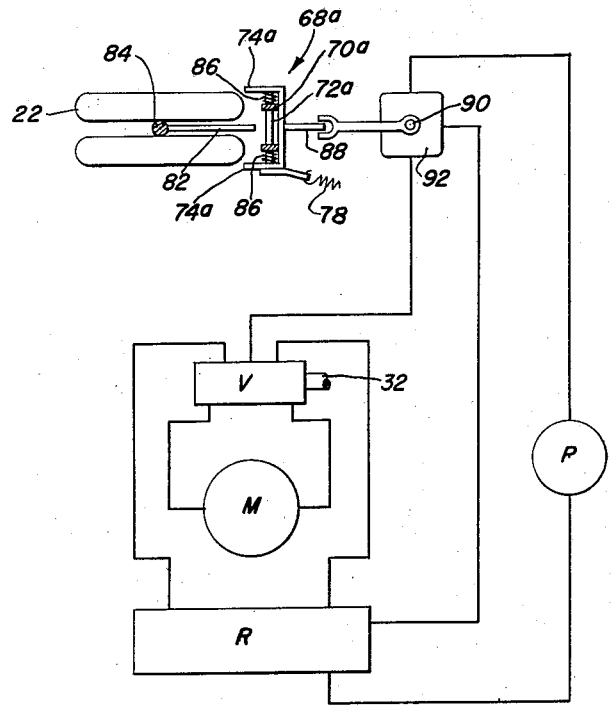
Fig. 4 is a schematic illustration of that form of the invention applied to a typical power steering system.

In that form of the invention shown in Fig. 4, there is exemplified the application of the invention to a tractor having hydraulic power steering, the several components of which are illustrated schematically in connection with the wheeled truck 22 and lower pedestal portion 84 of the steering mechanism. In a conventional structure, a hydraulic motor M is connected to the upright spindle 24 which in turn is connected to the lower pedestal portion 84 and thereby the supply of fluid under pressure to one side or the other of the motor will effect power steering of the wheels 22. The fluid pressure system is shown as including, in addition to the motor M, a valve V, a reservoir R and a pump P. The pump may be typically driven from the engine 28 of the tractor in any suitable manner, not important here. The valve is controlled by the steering shaft 32 for selective supply of fluid pressure to one side or the other of the motor M. According to this form of the invention, modified limit means 68a is effective to cut out the fluid pressure circuit when the wheels 22 are steered in excess of the limited range established by the limit means 68a. This means is similar to the means 68 and has a rockshaft 72a and forwardly projecting arms 74a, the rockshaft being mounted in a suitable support 70a. The means 68a is positionable between the first and second positions shown respectively in Figs. 1 and 2 and in addition the rockshaft 72a is axially shiftable to either side of a neutral position, to which neutral position it is normally returned by centering means comprising compression springs 86. In the down position, or operating position, of the limit means 68a, the arms 74a serve to engage the rearwardly projecting arm 82 on the truck 22 and thereby set up the same type of limits established by the limit means 68 in its Fig. 1 position. However, since the rockshaft 72a is also axially shiftable, the arm 82 operates as means to shift the rockshaft in one direction or the other, depending upon the direction of steering of the wheel means 22. As a further expedient, the limit means 68a has rigidly affixed thereto a rearwardly extending arm 88 which is normally received between the bifurcated front end of a pivoted valve arm 90, which arm controls a valve mechanism (not shown) within a valve casing 92. This valve is in addition to the valve V and in the neutral position of Fig. 4 leaves the circuit in its normal operating condition. However, upon over-steering of the wheels 22, so as to cause engagement between the truck arm 82 and one of the arms 74a of the limit means 68a, axial shifting of the means 68a is transmitted to the valve arm 90 and causes pump pressure to be by-passed to the reservoir. In other words, the cutout on the power steering system is established by means by-passing the main control valve V and motor M.

When the limit means 68a is raised to a position comparable to that shown in Fig. 2, the wheels 22 are released for normal steering and will therefore have no effect on the power steering system.

The several features of the invention have been pointed out above. Others will undoubtedly occur to those versed in the art, as will many modifications and alterations in the preferred embodiments of the invention disclosed herein, all of which may be achieved without departing from the spirit and scope of the invention.

What is claimed is:

1. In a tractor having a lift device and steering mechanism including steerable wheel means, the improvement comprising: limit means mounted on the tractor for movement between a first and second position for controlling the steering mechanism, said limit means in its first position being operative to limit the action of the steering mechanism for restricting steering of the steerable wheel means to a range less than normal and being operative in its second position to release the steering mechanism for normal steering of the steerable wheel means; and means connecting the limit means to the lift device for selectively incurring the positions of the former in response to actuation of the latter.

2. The invention defined in claim 1, in which: the positionable means includes a rockshaft carried by the tractor and having a pair of laterally spaced coplanar arms extending toward the steerable wheel means; and the steerable wheel means has an arm secured thereto and extending between and in the plane of the rockshaft arms and engageable with said arms when the positionable means is in its first position, said rockshaft arms clearing the steerable wheel means arm when said positionable means is in its second position.

3. In a tractor and implement combination in which the tractor has steering mechanism including steerable wheel means and the implement has a part extending in an operating position closely alongside of and subject to contact by the wheel means, and wherein the tractor has a lift device operative to raise the implement part clear of the wheel means the improvement comprising: limit means positionable on the tractor in an operating position to engage the steering mechanism to limit the amount of steering of the wheel means to less than normal so as to prevent contact of the wheel means with the implement part when said part is in its operating position, and said limit means being movable to a release position releasing the steering mechanism for normal steering of the wheel means; and means connected to the limit means and operative to incur the operating position of said limit means when the implement part is in its operating position and to incur the release position of said limit means when the implement part is raised by the lift device.

4. In a tractor having a lift device and further having steering mechanism including steerable wheel means controlled by a fluid-pressure power steering system, the improvement comprising: limit means mounted on the tractor for selective movement between a first position of engagement with the steering mechanism to limit steering of the wheel means to a range less than normal and a second position releasing the steering mechanism to enable normal steering of the wheel means, said limit means while in its first position being further shiftable from a neutral status when engaged by the steering mechanism; means interconnecting the limit means and the lift device for selectively incurring the first and second positions of said limit means in response to actuation of the lift device; and means interconnecting the limit means and the power steering system for cutting out the system in response to shifting of the limit means from its neutral status.

5. The invention defined in claim 4, in which: the limit means comprises a tractor-mounted rockshaft rockable between the first and second positions and axially shiftable from its neutral status, said rockshaft having means thereon engageable with and disengageable from the steering mechanism respectively in the first and second positions of said limit means.

6. The invention defined in claim 5, in which: the rockshaft is axially shiftable to either side of its neutral status, according to the direction of steering of the steerable wheel means.

7. The invention defined in claim 6, including: centering means normally maintaining the neutral status of the rockshaft.

8. The invention defined in claim 4, in which: the limit means is shiftable to either side of its neutral status, according to the direction of steering of the wheel means.

9. The invention defined in claim 8, including: centering means normally maintaining the neutral status of the limit means.

10. In a tractor having a lift device, a steering mechanism, and a steerable wheel, the improvement comprising: a member other than the wheel operative to move in response to adjustment of the steering mechanism, limit means mounted on the tractor for movement between a first and second position, said limit means in its first position being engageable with the member to limit the action of the steering mechanism for restricting steering of the steerable wheel means to a range less than normal, said limit means being operative in its second position to permit unrestricted movement of the member to release the steering mechanism for normal steering of the steerable wheel means; and means connecting the limit means to the lift device for selectively incurring the positions of the former in response to actuation of the latter.

References Cited in the file of this patent
UNITED STATES PATENTS

| | | |
|---|---|---|
| Re. 23,083 | Andrews et al. | Feb. 8, 1949 |
| 1,973,048 | Brown | Sept. 11, 1934 |
| 2,680,015 | Andrews et al. | June 1, 1954 |